(12) United States Patent
Chen

(10) Patent No.: US 7,556,188 B2
(45) Date of Patent: Jul. 7, 2009

(54) CLAMPING DEVICE FOR WELD SEAM-BACKING MEMBER

(76) Inventor: Mar Lon Chen, No. 40, Lane 85, Jhongdu St., Sanmin District, Kaohsiung City (TW)

( * ) Notice: Subject to any disclaimer, the term of this patent is extended or adjusted under 35 U.S.C. 154(b) by 147 days.

(21) Appl. No.: 11/797,778

(22) Filed: May 1, 2007

(65) Prior Publication Data

US 2007/0272670 A1    Nov. 29, 2007

(30) Foreign Application Priority Data

May 29, 2006    (TW) .............................. 95118939 A

(51) Int. Cl.
*B23K 37/04* (2006.01)
*B23K 5/22* (2006.01)
(52) U.S. Cl. .............................. 228/44.3; 228/50; 269/49
(58) Field of Classification Search .................... 269/49; 228/44.5, 49.1, 49.3, 49.4, 212, 44.3, 50
See application file for complete search history.

(56) References Cited

U.S. PATENT DOCUMENTS 2,146,901 A * 2/1939 Lane ........................... 228/139
3,913,821 A * 10/1975 Brandsma ..................... 228/216
5,067,696 A * 11/1991 Morley .......................... 269/49

* cited by examiner

*Primary Examiner*—Jessica L Ward
*Assistant Examiner*—Kevin E Yoon
(74) *Attorney, Agent, or Firm*—Rosenberg, Klein & Lee

(57) ABSTRACT

A clamping device includes a backing member having an upper face pressing against two work pieces having a welding gap therebetween. A rod extends through the backing member and has an exposed upper portion extending through a narrower portion of the welding gap into a wider portion of the welding gap. An elastic element is mounted between a bottom face of the backing member and an abutting portion on a lower portion of the rod to bias the backing member to press against the work pieces. The upper portion includes a hooked section having a first width smaller than a width of the narrower portion and a second width perpendicular to and larger than the width of the narrower portion. The rod is turnable to a position in which the second width of the hooked section presses against the work pieces under the action of the elastic element.

7 Claims, 7 Drawing Sheets

CLAMPING DEVICE FOR WELD SEAM-BACKING MEMBER

BACKGROUND OF THE INVENTION

1. Field of the Invention

The present invention relates to a clamping device and, more particularly, to a clamping device for a weld seam-backing member.

2. Description of the Related Art

Many welding techniques have been developed and generally utilize high temperature and/or high pressure to fill molten welding flux in a welding gap between two work pieces that become joined after the welding flux cools.

FIG. 1 of the drawings illustrates a weld seam-backing member 2 (backing member hereinafter) for preventing overflow of molten welding flux S during welding and for providing a neat appearance after welding. The backing member 2 is adhered by a tape 21 to bottom sides of two work pieces 1 to be welded together. The welding member 2 is made of heat-resistant material such as ceramics that will not melt or join the welding flux S during welding. A welding gap 11 between two work pieces 1 is aligned with an arcuate groove 22 in an inner face of the backing member 2 and, thus, covered and sealed by the backing member 2. Thus, the welding flux S is kept in the welding gap 11 without the risk of loss. However, it is difficult for a welder to fix the backing member 2 in the right position at the first time, for the eyesight of the welder is obstructed by the tape 21 such that the arcuate groove 22 cannot be precisely aligned with the welding gap 11. Namely, the welder has to tear off the tape 21 in the incorrect position and redo the pre-welding job until the arcuate groove 22 of the backing member 2 is aligned with the welding gap 11. The pre-welding job becomes more difficult when the welding gap 11 is relatively long. The welding efficiency is, thus, low. Furthermore, the adhesion of the tape 21 deteriorates when the temperature rises due to welding, leading to the risk of loosening or falling of the backing member 2 before the welding flux S in the welding gap 11 cools and takes shape. Furthermore, toxic gas with unpleasant odor is generated when the adhesive 211 on the tape 21 is heated during welding, causing hazard to human health, which is particularly severe when in a space that is isolated or having poor ventilation. Furthermore, the tape 21 is generally made of aluminum foil and, thus, not recyclable after use. Pollution of environment occurs if the used tape 21 is not properly handled.

SUMMARY OF THE INVENTION

An objective of the present invention is to provide a clamping device that can easily fix a weld seam-backing member in place during welding. Welding quality is improved and welding efficiency is enhanced while keeping a tidy working environment.

Another objective of the present invention is to provide a clamping device for fixing a weld seam-backing member without utilizing tapes, reducing pollution to the environment.

A clamping device according to the preferred teachings of the present invention includes a backing member and a clamping unit. The backing member includes an upper face adapted to press against two work pieces to be welded together. The backing member further includes a bottom face. The clamping unit includes a rod extending through the backing member and having an exposed upper portion and an exposed lower portion. The upper portion is adapted to extend through a narrower portion of a welding gap between the work pieces into a wider portion of the welding gap. The lower portion includes an abutting portion formed thereon. An elastic element is mounted between the bottom face of the backing member and the abutting portion to bias the backing member to press against the work pieces. The upper portion includes a hooked section having a first width smaller than a width of the narrower portion of the welding gap allowing the hooked section to extend through the narrower portion into the wider portion of the welding gap between the work pieces. The hooked section has a second width perpendicular to and larger than the width of the narrower portion of the welding gap. The rod is turnable to a position in which the second width of the hooked section presses against the work pieces under action of the elastic element.

Preferably, the backing member includes a through-hole aligned with the narrower portion of the welding gap. The through-hole includes an enlarged section in the upper face of the backing member and wider than the narrower portion of the welding gap. The elastic element is a coil spring.

In an example, the abutting portion is a fastener having a screw hole, and the lower portion of the rod includes outer threading threadedly engaged with the screw hole.

Preferably, the upper portion is made of a material having a melting point in a range between 40° C. and 820° C.

In another example, the abutting portion includes a ring having a circumference. The ring includes a central opening and two diametrically opposed slots each extending radially outward from an inner periphery defining the central opening. Two catch plates extend from the circumference of the ring and respectively engage with two upper edges of the backing member. The lower portion of the rod includes a lower end having a width parallel to the second width of the hooked section. The width of the lower end of the lower portion is larger than a diameter of the central opening and smaller than an overall length of the slots. The rod is movable in a vertical direction when the width of the lower end of the lower portion is aligned with the slots. The rod is not movable in the vertical direction when the rod is turned to a position where the width of the lower end of the lower portion is not aligned with the slots. The ring includes a stop wall on the circumference thereof and surrounding at least a portion of the elastic element. Each catch plate includes a first section in contact with the bottom face of the backing member and a second section having a distal end engaged with an associated one of the upper edges of the backing plate. Each upper edge of the backing member includes a notch for receiving and engaging with one of the catch plates.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
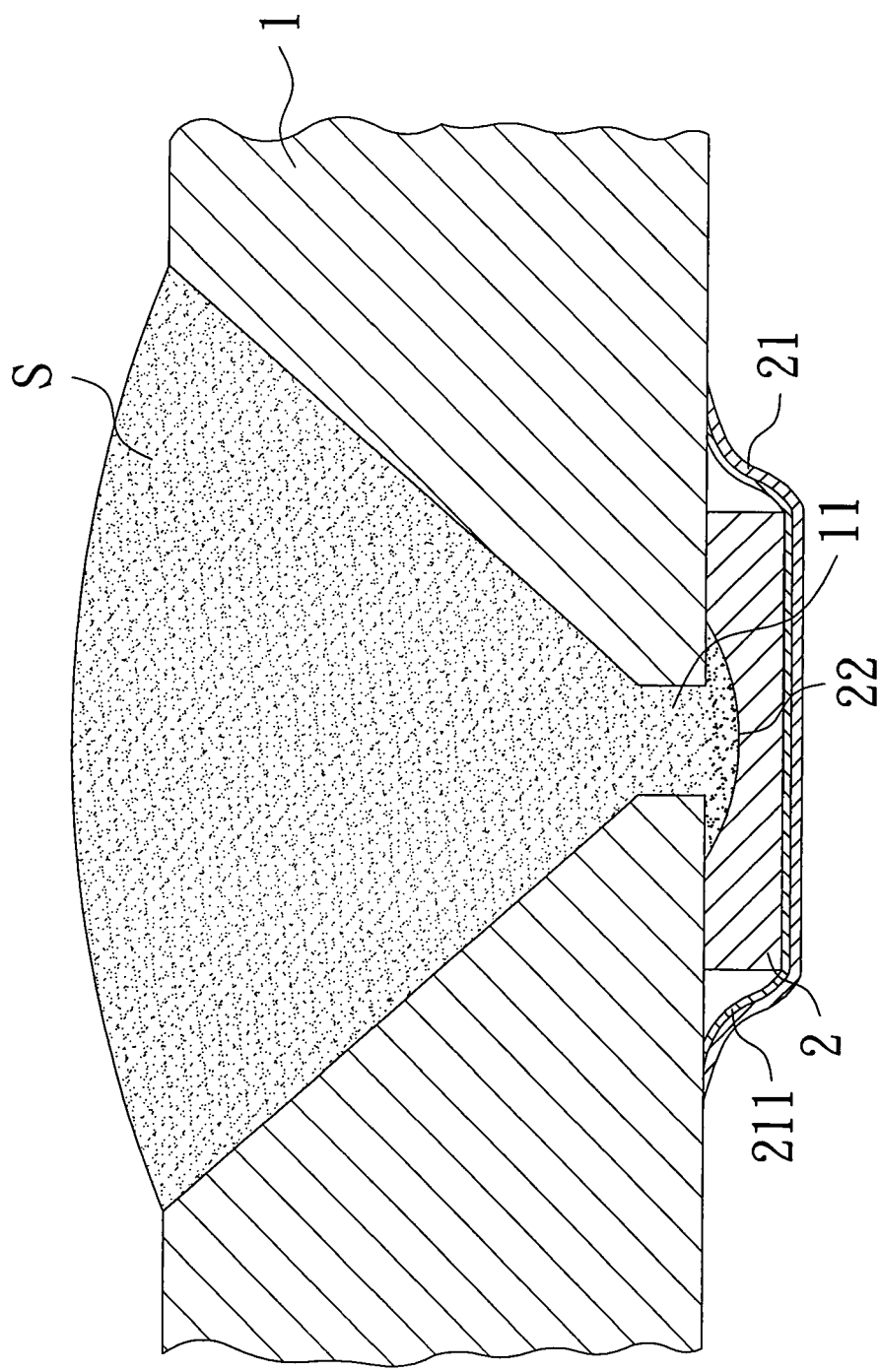
FIG. 1 shows a sectional view of two work pieces to be welded together and a conventional weld seam-backing member for sealing a welding gap between the work pieces.
Figure 2:
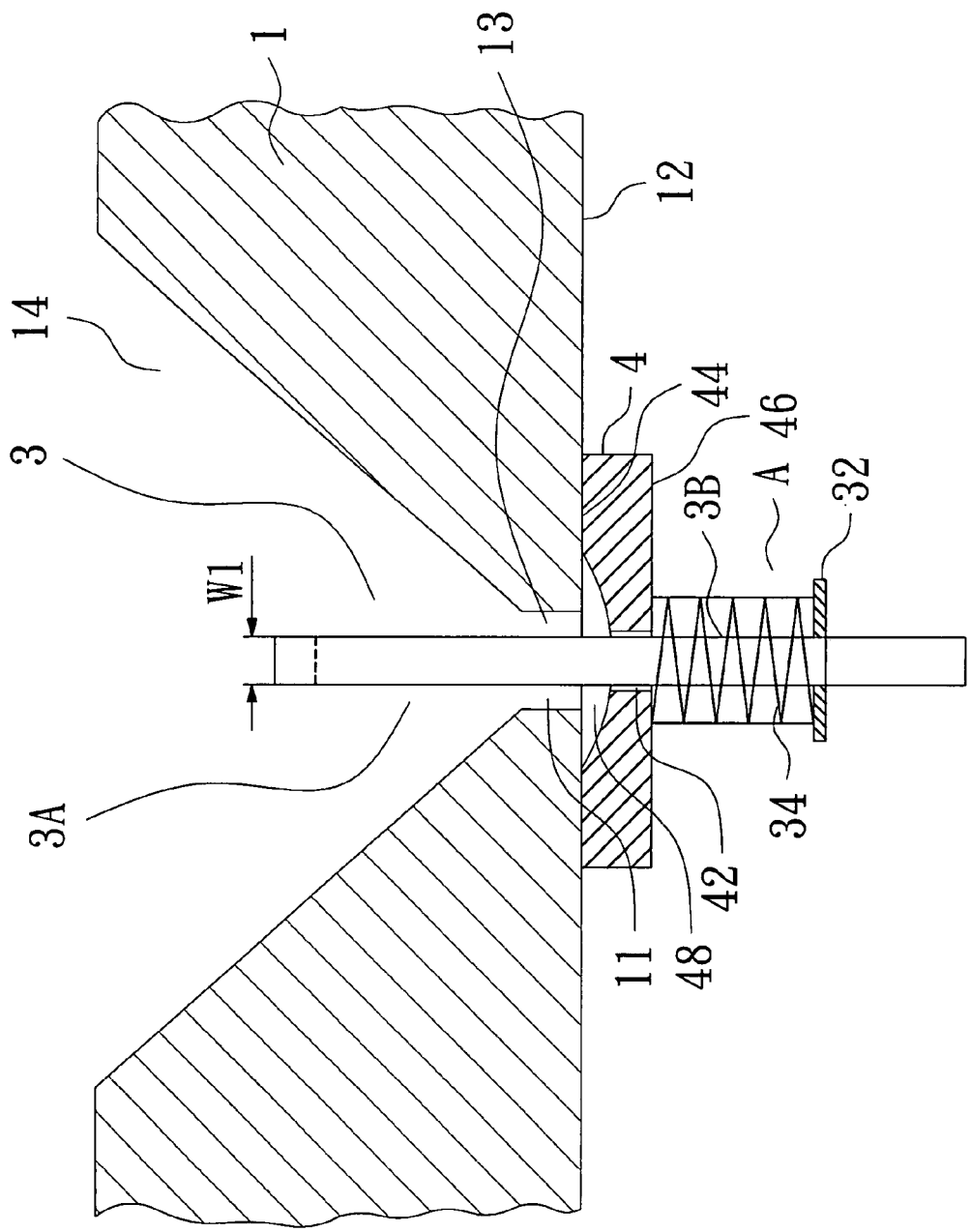
FIG. 2 shows a sectional view of two work pieces and a clamping device of an embodiment in accordance with the present invention.
Figure 3:
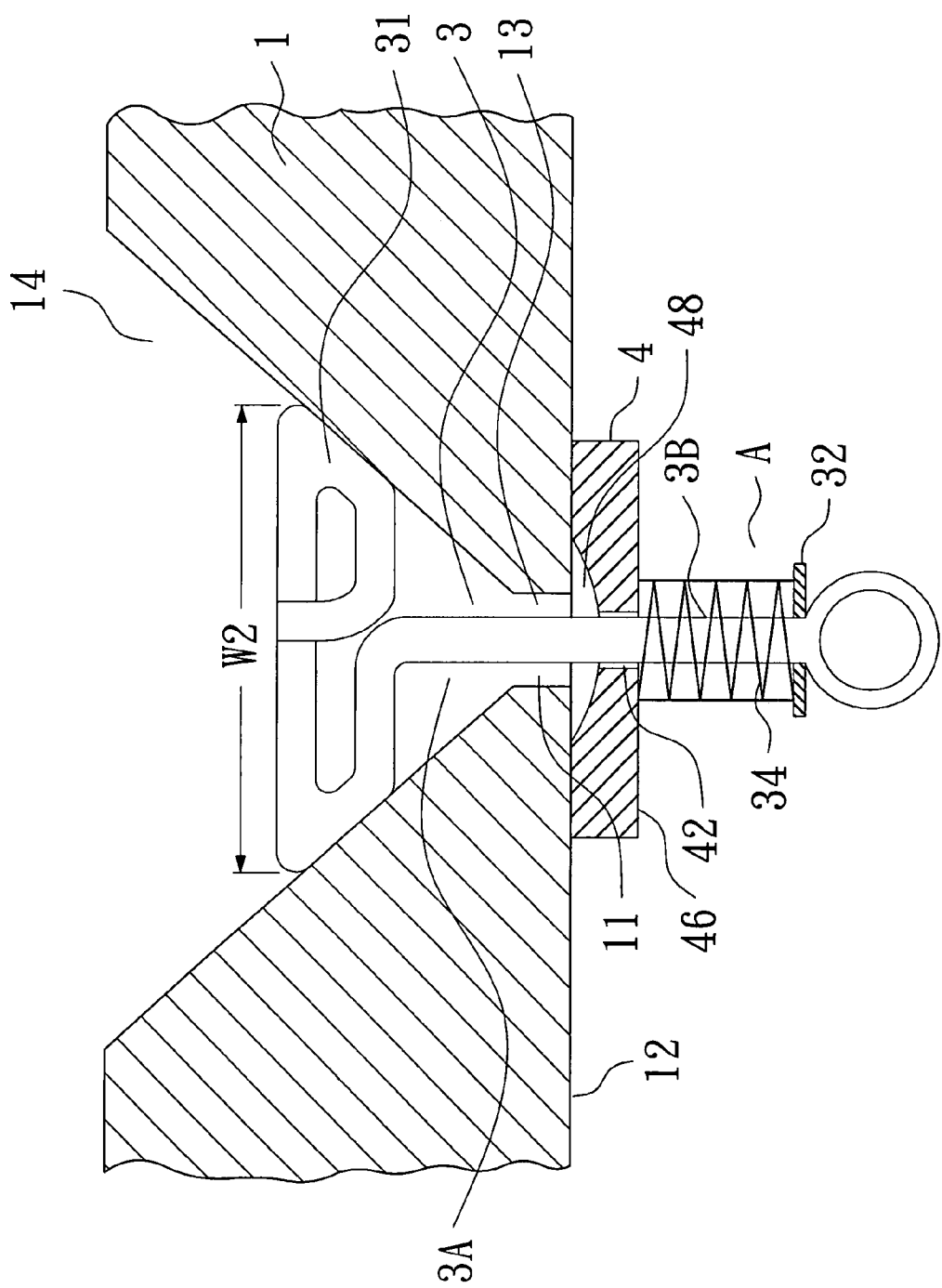
FIG. 3 is a sectional view similar to FIG. 2, wherein a rod of the clamping device is turned 90 degrees.
Figure 4:
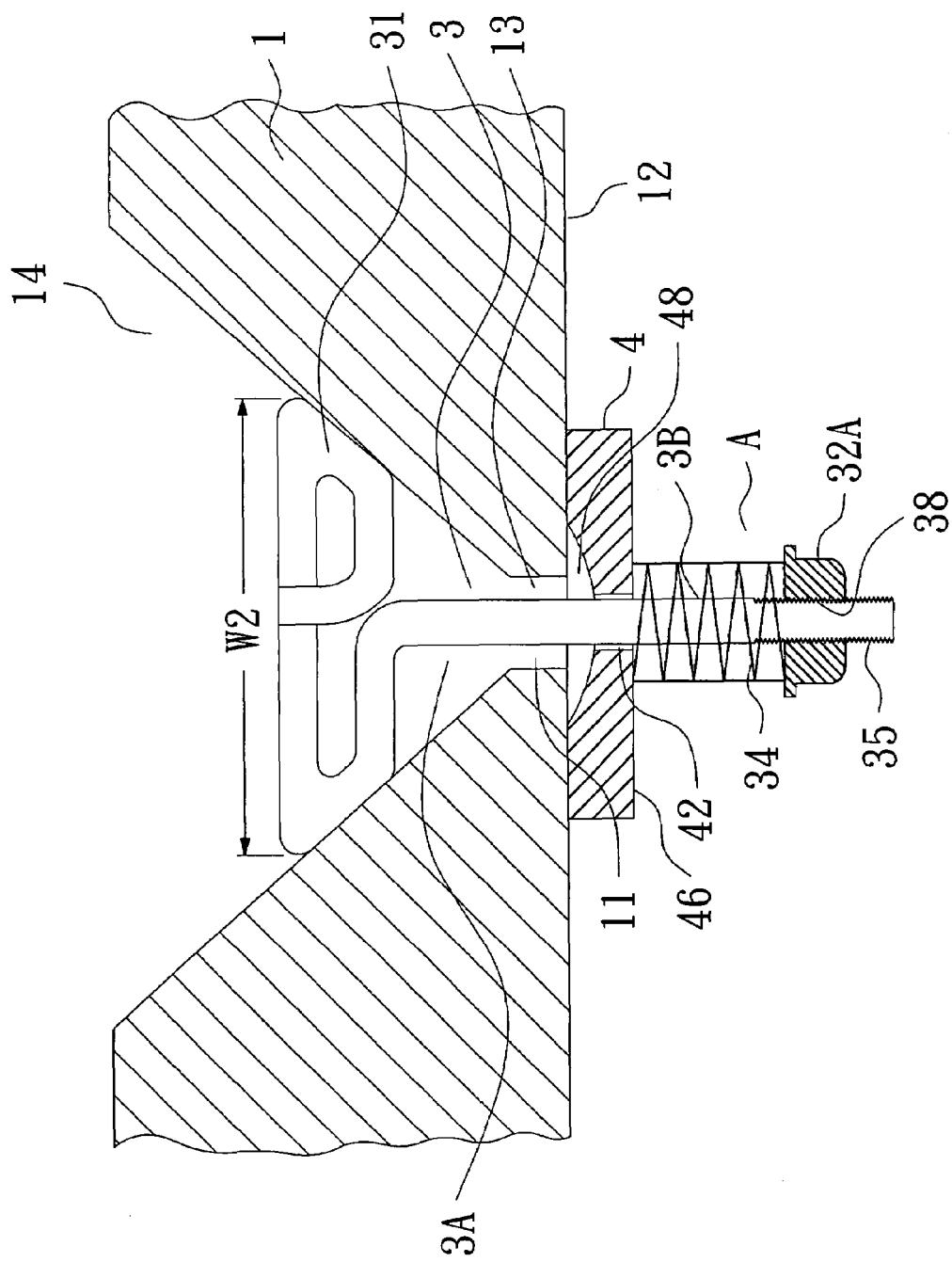
FIG. 4 shows a sectional view of two work pieces and a clamping device of another embodiment in accordance with the present invention.

Referring to FIGS. 2 through 4, a clamping device of an embodiment in accordance with the present invention includes a weld seam-backing member 4 (backing member hereinafter) and a clamping unit A. The backing member 4 is made of ceramic material resistant to high temperature. The backing member 4 includes a through-hole 42 aligned with a welding gap 11 between two work pieces 1 to be welded together. The welding gap 11 includes a narrower portion 13 and a wider portion 14. The backing member 4 includes an upper face 44 in contact with bottom sides 12 of the work pieces 1 and a bottom face 46 opposite to the upper face 44. The upper face 44 of the backing member 4 has a width larger than that of the welding gap 11. Furthermore, the through-hole 42 has an enlarged section 48 in the upper face 44 of the backing member 44 and has a width larger than that of the narrower portion 13 of the welding gap 11.

The clamping unit A includes a rod 3 extending through the through-hole 42 of the backing member 4 and having an exposed upper portion 3A and an exposed lower portion 3B. The upper portion 3A extends through the narrower portion 13 of the welding gap 11 into the wider portion 14 of the welding gap 11. The upper portion 3A includes a hooked section 31 having a first width W1 smaller than a width of the narrower portion 13 of the welding gap 11 and a second width W2 perpendicular to and larger than the width of the necked portion 13 of the welding gap 11. The lower portion 3B of the rod 3 outside the work pieces 1 includes an abutting portion 32 formed thereon and adjacent to the lower end of the rod 3. An elastic element 34 is mounted between the abutting portion 32 and the bottom face 46 of the backing member 4 to bias the backing member 4 to press against the bottom sides 12 of the working pieces 1. In the preferred form shown, the elastic element 34 is a coil spring mounted around the lower portion 3B of the rod 3. Specifically, the upper portion 3A that has extended into the space between the work pieces 1 is bent to form a hooked section 31 having the second width W2 perpendicular to and larger than the first width W1. The rod 3 can be turned 90 to a position shown in FIG. 3 such that two ends of the hooked section 31 respectively abut two opposed faces of the working pieces 1. The elastic element 34 is compressed during installation and, thus, provides a returning force that not only assures the backing member 4 to press against the work pieces 1 but also bias the hooked section 31 of the rod 3 to press against the work pieces 1. Namely, the backing member 4 and the hooked section 31 of the rod 3 together provide a clamping force for the work pieces 1. The welding gap 11 of the working pieces 1 is therefore sealed by the backing member 4.

It is known that the melting point of welding materials should not be too high and not to be too low for the purposes of allowing rapid welding and avoiding damage to the work pieces to be welded. Generally, a welding flux is called a hard welding material if it has a melting point higher than 450° C., or a soft welding material if lower than 450° C. General welding fluxes include Sn—Ag alloys, Sn—Cu alloys, Sn—Ag—Cu alloys, and Sn—Ag—Cu—Ni—Ge alloys.

The upper portion 3A is made of a welding flux having a melting point in a range between 40° C. and 820° C. After welding, the upper portion 3A and the welding flux filled in the welding gap 11 between the work pieces 1 are joined together without the need of further processing. The lower portion 3B also melts if it is made of a material the same as that of the upper portion 3A.

FIG. 4 shows another embodiment in accordance with the present invention, wherein the abutting portion 32A is in the form of a fastener having a screw hole 38, and the lower portion 3B of the rod 3 includes outer threading 35 threadedly engaged with the screw hole 38. This allows the fastener 32A to move toward or away from the backing member 4

In the above two embodiments, leakage of the welding flux is prevented by clamping the work pieces 1 with the hooked section 31 of the rod 3 and the backing member 4 under the action of the elastic element 34, allowing rapid, easy, and efficient welding. The welding flux that enters the enlarged section 48 of the through-hole 42 of the backing member 4 rapidly solidifies due to excellent heat-insulating effect provided by the backing member 4. The upper portion 3A of the rod 3 melts and joins the welding flux entering the enlarged section 48 of the through-hole 42 of the backing member 4 during welding. The lower portion 3B of the rod 3 separates from the molten upper portion 3A and falls. No waste material is generated and no risk of dispersion of toxic gas.

Figure 5:
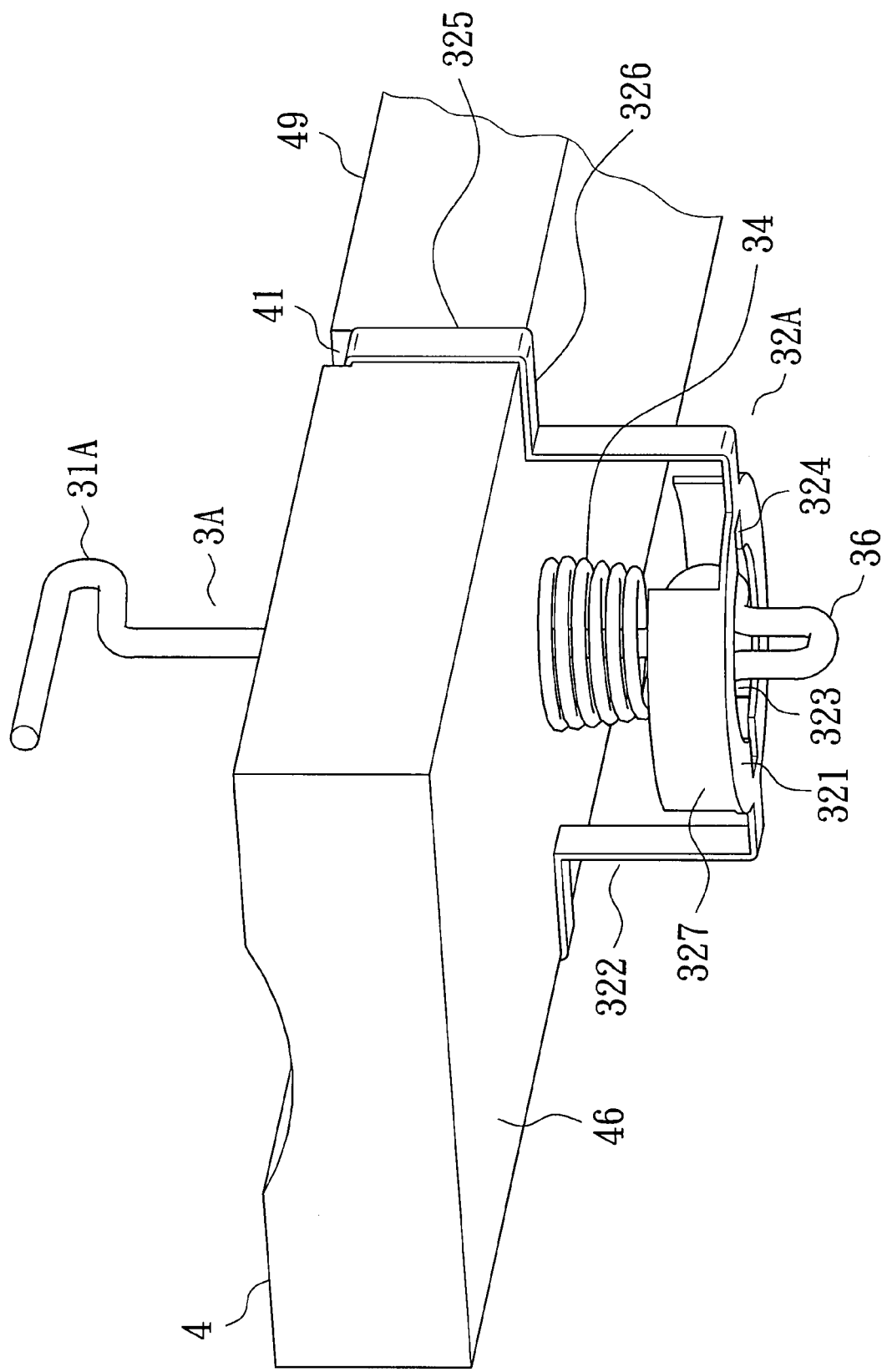
FIG. 5 shows a perspective view of a clamping device of a further embodiment in accordance with the present invention.
Figure 7:
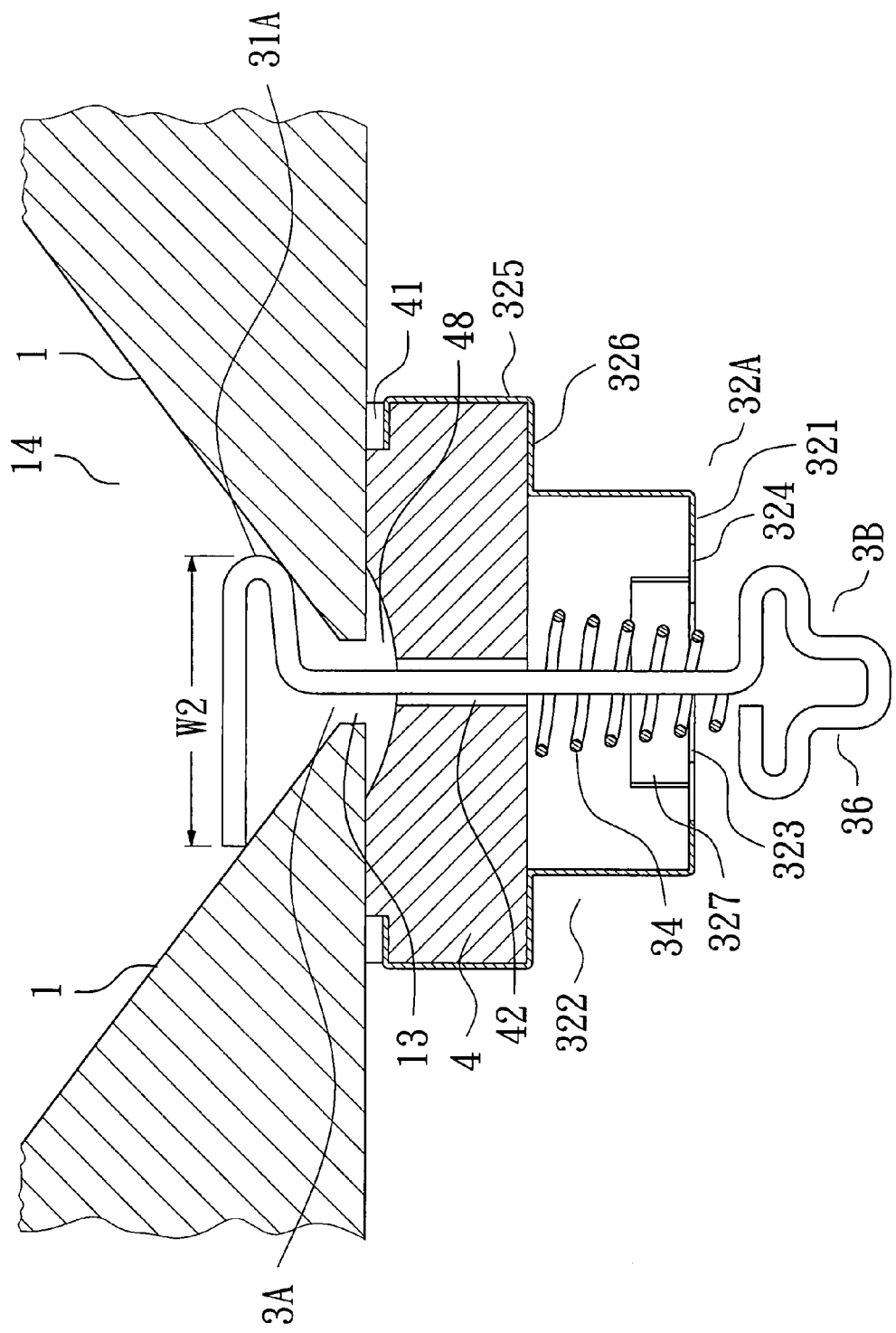
FIG. 7 is a sectional view similar to FIG. 6, wherein a rod of the clamping device is moved downward.

FIG. 5 shows a further embodiment in accordance with the present invention. In this embodiment, the abutting portion 32A includes a ring 321 having a stop wall 327 extending upward along at least a portion of a circumference thereof. The peripheral wall 327 surrounds at least a portion of the elastic element 34 to stabilize the elastic element 34 in a case that the elastic element 34 vibrates. Two catch plates 322 extend radially outward and then upward from the circumference of the ring 321 and each include a first section 326 in contact with the bottom face 46 of the backing member 4 and a second section 325 having a hooked distal end engaged in a notch 41 in one of two upper edges 49 of the backing member 4. The ring 321 includes a central opening 323 and two diametrically opposed slots 324 each extending radially outward from an inner periphery defining the central opening 323. An overall length of the slots 324 (i.e., the distance between the distal ends of the slots 324) is, thus, greater than the diameter of the central opening 323. With reference to FIG. 7, the lower portion 3B of the rod 3 includes a lower end having a width 36 parallel to the second width W2 of the hooked section 31 of the rod 3. The width 36 of the lower end of the rod 3 is larger than the diameter of the central opening 323 of the ring 321 and smaller than an overall length of the slots 324. Namely, the rod 3 is movable in a vertical direction when the width 36 of the lower end of the rod 3 is aligned with the slots 324, and the rod 3 is not movable in the vertical direction when the rod 3 is turned to a position where the width 36 of the lower end of the rod 3 is not aligned with the slots 324. Catch plates 322 of other forms and shapes would be within the skill of the art.

Figure 6:
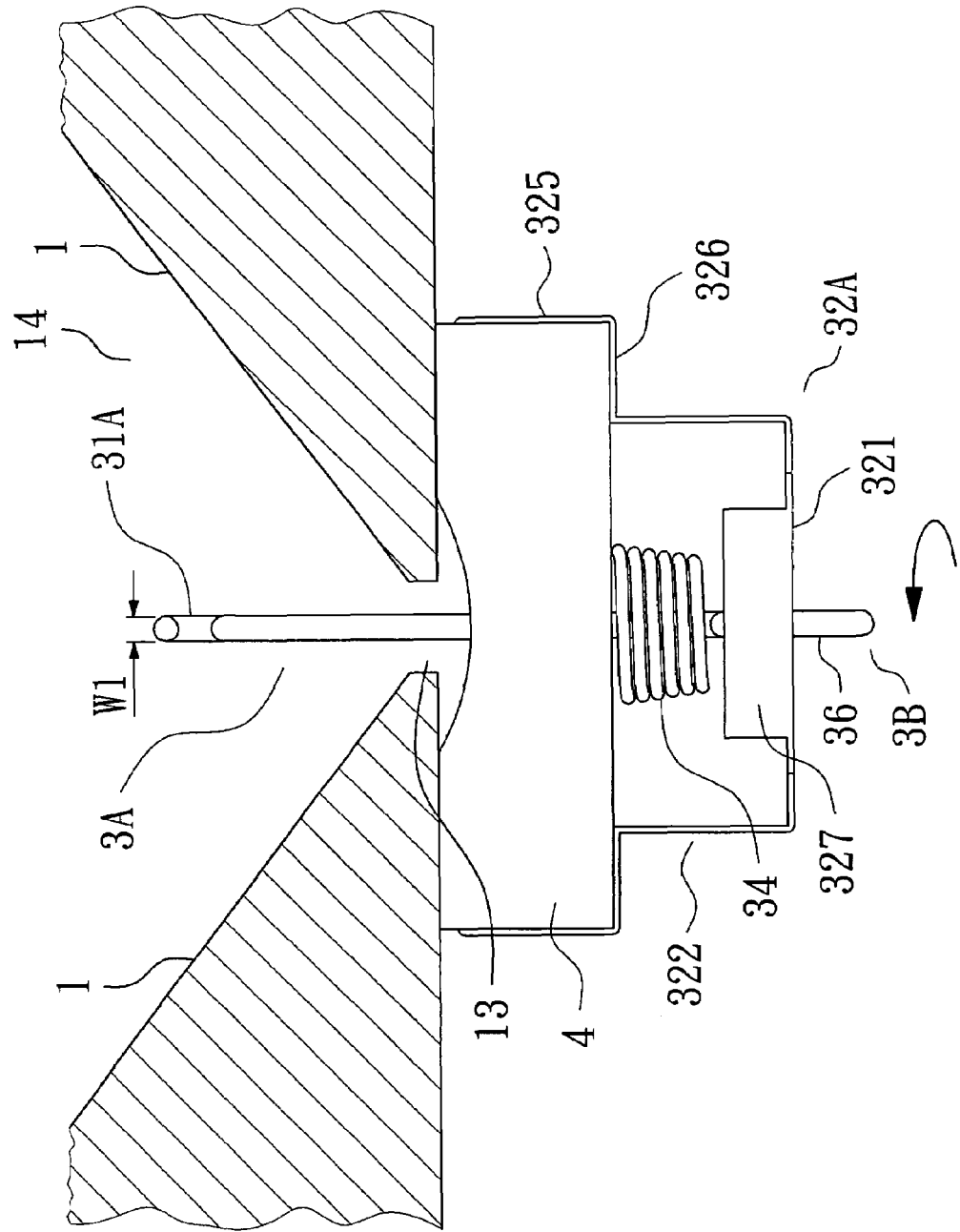
FIG. 6 shows a sectional view of two work pieces and the clamping device of FIG. 5.

With reference to FIGS. 6 and 7, in use, the elastic element 34 is compressed and located between the backing member 4 and the ring 321 of the abutting portion 32A, with the width 36 of the lower end of the rod 3 not aligned with the slots 324. The upper portion 3A of the rod 3 is then extended into the welding gap 11 between the work pieces 1. The upper portion 3A is bent to form a hooked section 31 having a first width W1 smaller than the width of the narrower portion 13 of the welding gap 11 and a second width W2 perpendicular to and larger than the width of the narrower portion 13 of the welding gap 11. Since the width 36 of the lower end of the rod 3 is parallel to the second width W2 of the hooked section 31, the user can know the exact orientation of the hooked portion 31 without seeing it. The rod 3 is then turned to align the width 36 of the lower end of the rod 3 with the slots 324. Next, the rod 3 is moved downward under the returning force of the elastic element 34 until the width 36 of the lower end of the rod 3 is below the slots 324 of the ring 321. This also imparts a downward force to the hooked section 31 of the rod 3 to press against the work pieces 1. Thus, the work pieces 1 are securely clamped by the hooked section 31 of the rod 3 and the backing member 4.

Although specific embodiments have been illustrated and described, numerous modifications and variations are still possible without departing from the teachings of the invention. The scope of the invention is limited by the accompanying claims.

The invention claimed is:

1. A clamping device comprising:
a backing member including an upper face adapted to press against two work pieces to be welded together, with the backing member further including a bottom face; and
a clamping unit including a rod extending through the backing member and having an exposed upper portion and an exposed lower portion, with the upper portion being adapted to extend through a narrower portion of a welding gap between the work pieces into a wider portion of the welding gap, with the lower portion including an abutting portion formed thereon, with an elastic element being mounted between the bottom face of the backing member and the abutting portion to bias the backing member to press against the work pieces, with the upper portion including a hooked section having a first width smaller than a width of the narrower portion of the welding gap allowing the hooked section to extend through the narrower portion into the wider portion of the welding gap between the work pieces, with the hooked section having a second width perpendicular to and larger than the width of the narrower portion of the welding gap, with the rod being turnable to a position in which the second width of the hooked section presses against the work pieces under action of the elastic element, and
with the abutting portion including a ring having a circumference, with the ring including a central opening and two diametrically opposed slots each extending radially outward from an inner periphery defining the central opening, with two catch plates extending from the circumference of the ring and respectively engaged with two upper edges of the backing member, with the lower portion of the rod including a lower end having a width parallel to the second width of the hooked section, with the width of the lower end of the lower portion being larger than a diameter of the central opening and smaller than an overall length of the slots, with the rod being movable in a vertical direction when the width of the lower end of the lower portion is aligned with the slots, and with the rod being not movable in the vertical direction when the rod is turned to a position where the width of the lower end of the lower portion is not aligned with the slots.

2. The clamping device as claimed in claim 1, with the elastic element being a coil spring.

3. The clamping device as claimed in claim 1, with the upper portion being made of a material having a melting point in a range between 40° C. and 820° C.

4. The clamping device as claimed in claim 1, with the ring includes a stop wall on the circumference thereof and surrounding at least a portion of the elastic element.

5. The clamping device as claimed in claim 1, with each said catch plate including a first section in contact with the bottom face of the backing member and a second section having a distal end engaged with an associated one of the upper edges of the backing plate.

6. The clamping device as claimed in claim 5, with each said upper edge of the backing member including a notch for receiving and engaging with one of the catch plates.

7. The clamping device as claimed in claim 1, with the backing member including a through-hole aligned with the narrower portion of the welding gap, with the through-hole including an enlarged section in the upper face of the backing member and wider than the narrower portion of the welding gap.

* * * * *